(12) United States Patent
Kelly

(10) Patent No.: US 6,586,031 B1
(45) Date of Patent: Jul. 1, 2003

(54) METHOD FOR PRODUCING EXPANDED, SHAPED PELLET PRODUCTS

(75) Inventor: Joseph William Kelly, Grapevine, TX (US)

(73) Assignee: Recot, Inc., Pleasanton, CA (US)

(*) Notice: Subject to any disclaimer, the term of this patent is extended or adjusted under 35 U.S.C. 154(b) by 0 days.

(21) Appl. No.: 10/152,668

(22) Filed: May 21, 2002

(51) Int. Cl.[7] .................................................. A21D 8/00
(52) U.S. Cl. ...................... 426/516; 426/499; 426/503; 426/514
(58) Field of Search ................................. 426/499, 516, 426/446, 448, 503, 514; 425/445

(56) References Cited

U.S. PATENT DOCUMENTS

| | | | |
|---|---|---|---|
| 3,348,950 A | 10/1967 | Weiss | |
| 3,615,675 A | 10/1971 | Wisdom et al. | |
| 3,646,894 A | * 3/1972 | Hasten et al. | ............... 426/503 |
| 4,163,804 A | 8/1979 | Meyer et al. | |
| 4,259,051 A | 3/1981 | Shatila | |
| 4,262,028 A | 4/1981 | Meyer et al. | |
| 5,132,127 A | 7/1992 | Wisdom | |
| 5,198,257 A | * 3/1993 | Heck et al. | ............... 426/503 |
| 5,645,872 A | 7/1997 | Funahashi | |
| 5,750,170 A | 5/1998 | Daouse et al. | |
| 6,165,530 A | 12/2000 | Mathew et al. | |
| 6,224,933 B1 | 5/2001 | Bhaskar et al. | |
| 6,242,034 B1 | 6/2001 | Bhaskar et al. | |
| 6,328,550 B1 | 12/2001 | Sheen et al. | |

* cited by examiner

*Primary Examiner*—George C. Yeung
(74) *Attorney, Agent, or Firm*—Colin P. Cahoon; Carstens, Yee & Cahoon, L.L.P.

(57) ABSTRACT

The method for producing an expanded, shaped pellet products with an annular cavity includes extruding a mixture to form a tubular extrudate. This is formed by extruding dough around and through a die insert having one or more sources for injecting air, other inert gas, or liquid into an annular cavity into a portion of the tubular extrudate. After exiting the extruder, the shaped extrudate initially expands at it exits the extruder die but is then stretched so as to substantially return the extrudate to an unexpanded state. Thereafter, the stretched extrudate is cut into shaped pellets with annular cavities. Upon being further heated, for example, in a hot air puffer, the pieces are puffed to produce expanded, shaped snack products with annular cavities without the need for a dehydration and/or conditioning step.

27 Claims, 3 Drawing Sheets

METHOD FOR PRODUCING EXPANDED, SHAPED PELLET PRODUCTS

BACKGROUND OF THE INVENTION

1. Technical Field

The present invention relates generally to a method for making snack food products. More particularly, the invention relates to a method of utilizing extrudate stretching for making an expanded, shaped, pellet snack with annular cavities.

2. Description of Related Art

Pellet, or "half product" technology, is known in the snack industry for producing puffed snack products. Pellet products, prior to puffing (expansion), provide several advantages, which include the following: a high bulk density, which makes them less expensive to ship, breakage resistance during shipment, and the ability to form intricate shapes. Once puffed pellet products have a light, expanded texture because of their low product density and a thin product wall thickness, for example less than 0.20 inches.

Generally, an expandable pellet is one that increases in volume by upwards of 100% from the rapid vaporization of water within the pellet during rapid heating of the pellet. Consequently, the density of the pellet decreases. For example, the initial density of a typical pellet piece is greater than about 40 lb/ft3 and following expansion is reduced down to a final density of less than about 25 lb/ft3.

Typical pellets require processing to produce a finished snack product. In a first step, the ingredients, which generally include cereal products and starches, are hydrated to form an extrudable mixture for forming pellets. The extrudable mixture is subsequently gelatinized to create dough that is subsequently passed through a die where after the extruded mixture is cut into pellets. After formation, the unfinished pellets, which contain from about 20% to about 30% moisture by weight, are processed through a dryer to arrive at a final moisture of about 9% to about 18% for either storage or later processing after moisture equilibration.

To produce a product that has desirable texture, density and other characteristics, the pellets made using the prior art method need to be dried and moisture equilibrated, which is essentially a curing stage. This curing stage can extend from a period of less than an hour up to several days or longer. This step reduces the moisture content significantly from about 25% down to about 12% for example. Once dried, the pellets can then be expanded by heating with, for example, frying, baking (hot air impingement), or microwave heating. This drying/curing stage adds expense and time to the pellet manufacturing process.

Processes for producing pellets for use as a snack food product are known in the art. For example, U.S. Pat. No. 3,348,950 to Weiss describes a process for making snack food product by first mixing together corn, sucrose, water, and flavoring. This mixture is combined with a second mixture of yellow corn grits, water, and sodium bicarbonate. The combined mixture is pre-cooked under pressure of 14 psi to 20 psi and temperatures between 247° F. and 259° F. The gelatinized dough is shaped, and then dried and/or moisture equilibrated before puffing using deep-fat frying. This process requires extensive drying time and a tempering period of ½ to 2 hours.

In pellet processing, it is possible to use dies with intricate designs. Because of the high viscosity or "stiffness" of the dough, it is possible to cut the dough as it exits the die face and retain the intricate die design in the cut, unexpanded pellet. Many food products exist which are extruded through a ring-shaped die to create an annular cavity, with perhaps the most common being macaroni. Macaroni, however, requires extensive drying time and is not usually expanded as a snack product. Macaroni is also not commonly injected at the die with a gas or fluid. While filled tubular snack products are known, they are not expanded pellet products, U.S. Pat. No. 3,615,675 to Fowler et al. discloses an apparatus to fill an extruded, tubular snack with a suitable material. The disclosed procedure expands the product at the die and does not produce a pellet product. The product is also not stretched. U.S. Pat. No. 4,259,051 to Shatila discloses an apparatus and method for extruding one material to surround another. However, no disclosure is made of using the apparatus to make pellet snacks, and furthermore, there is no discussion of stretching the product.

Animal protein is known to be used for forming pellets. U.S. Pat. No. 4,163,804 to Meyer et al. describes producing expandable pellets by extruding animal parts at temperatures between 250° F. and 330° F. with an extrusion pressure over 500 psig. It is essential to this process that the raw material be animal parts that have a high average undenatured protein (collagen) content. The high collagen content allows the formation, under the disclosed process conditions to be formed after extrusion into a shaped sustaining form and cut into puffable pellets. It is disclosed that stretching ratios of from 2:1 to 5:1 are used in some applications of this invention but stretching is not used when annular shapes are made. No disclosure is made of stretching an annular shape and no gas or fluid is injected in the cavity of the annular shapes.

U.S. Pat. No. 5,645,872 to Funahashi describes an apparatus for processing food in a tubular shape and filling it with a hot liquid. This is done to prevent collapsing of the product wall because of the flowability of the product material. No disclosure is made of using this apparatus to make pellets and no method of stretching the product is disclosed.

U.S. Pat. No. 5,750,170 to Daouse et al. discloses a method of co-extruding food material in a tube shape with filling. The dough tube and filling are supported on a movable support and then cut with blades while being transported. The blades cause slight stretching of the tube only at the point of cutting but there is little or no manipulation or stretching of the remainder of the dough. No disclosure is made of using this apparatus to make a pellet product.

U.S. Pat. No. 6,242,034 to Bhaskar et al. describes a process to make tube-shaped pellets. The process involves using tension rolls to stretch a ribbon extruded from the die face. This stretching is at less than a 2:1 ratio, and these pellets still require a drying step prior to expansion. There is also no air or fluid injection into the product because an annular die is not used.

U.S. Pat. No. 6,328,550 to Sheen et al. discloses a multiple extrusion nozzle for extruding a tube-shaped casing with filling injected inside the casing. However, no disclosure is made of using the apparatus to make a pellet product nor is there disclosure of stretching the product.

A process to produce an expanded, shaped, pellet snack product with annular cavities and a low bulk density similar in texture to a pellet product while avoiding the processing detriments for a pellet process is desired. Further, it would be advantageous to produce a shaped snack product with annular cavities without the need for a pellet finish drying and/or conditioning stage. Consequently, a need exists for producing a shaped pellet snack product with annular cavities that is easily produced while having a desirable texture and shape.

SUMMARY OF THE INVENTION

The present invention is an improved method for producing a shaped pellet product with annular cavities having a light texture once expanded, without the need for a dehydration/tempering step of over 10 minutes prior to expansion. A farinaceous meal, which can include yellow corn meal, white corn meal, corn masa flour, rice meal, wheat flour, or mixtures thereof is provided to an extruder along with a source of water. In addition to the farinaceous meal, a protein such as soy protein can be substituted, at least in part, for some of the meal. Other ingredients can be used in addition to the aforementioned such as sugar, dextrose, dry molasses, wheat bran, emulsifier, shortening, modified food starches, leavening, and others.

During extrusion, the mixture is mechanically sheared and gelatinized within the extruder under conditions of shear, pressure, and temperature for opening the starch granules. The mixture is extruded through a die insert that forms an extrudate with an annular cavity. Upon passing through the die, the extrudate forms a tube, which "prepuffs" upon exiting the extruder due to steam being released from the reduction in pressure. This prepuffing facilitates a reduction in the moisture content of the ribbon from about 15% to about 30% down to about 9% to about 20%.

To convert the prepuffed tube to an unpuffed pellet consistency, the tube is stretched by passing it through a series of rollers. To facilitate this, the tube has air, other inert gas, or liquid injected into the cavity in the middle thereof. This injection provides a positive pressure within the tube of extrudate to allow it to be gripped by rollers without collapsing the extrudate tube.

The extrudate with an annular cavity is then passed between the stretching rollers whereby the linear velocity of the extrudate is increased by at least 1.5 times, more preferably at least three times. The tension in the ribbon, provided by the stretching rollers, counteracts the expansion caused by the prepuffing at the die due to steam formation. This results in the ribbon, after initial expansion, to return to an unexpanded, thin pellet-like nature with a density greater than 40 lb/ft3 and a thickness of less than 0.1 inches. The stretched extrudate is then cut into shaped pellets with annular cavities that are subsequently puffed in a hot air puffer for example. Advantageously, the stretched pellets do not require any drying or conditioning such as moisture equilibration prior to being puffed. Thereafter, the puffed pieces are then finish dried and seasoned prior to packaging.

Regarding the shapes produced, the shaped product can resemble, for example, a ring or a wheel with one or more spokes. Depending on the die insert used, one or more lines of extrudate can be allowed to bisect the wheel. Each annular cavity of the extrudate is supplied with air or other gas to allow sufficient pressure to retain the ring or wheel shape during the stretching phase. Once stretched, the extrudate is cut into pellets for additional processing into puffed snack products. Depending on the speed of the cutter, thin shapes such as rings, or longer shapes, such as tubes, can be made. Also, one or both ends of the cut pieces can be sealed forming them into pocket or pillow shaped pieces.

After puffing, shaped snack products with annular cavities are produced having a low bulk density similar to conventional pellet type products. However, this is advantageously achieved without the need for a drying and/or conditioning step prior to puffing.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 3b is a side cross sectional view of the die insert of FIG. 3a;

FIG. 4c is an exploded view of the die insert of FIG. 4a;

FIG. 5a is a prospective view of an exemplary hollow shaped pellet product produced with the die insert of FIG. 3a;

FIG. 5b is a prospective view of an exemplary hollow shaped puffed product produced with the die insert of FIG. 3a;

FIG. 6a is a perspective view of an exemplary hollow shaped pellet product produced with a die insert of FIG. 4a; and FIG. 6b is a prospective view of any exemplary hollow shaped puffed product produced with the die insert of FIG. 4a.

DETAILED DESCRIPTION

Figure 1:
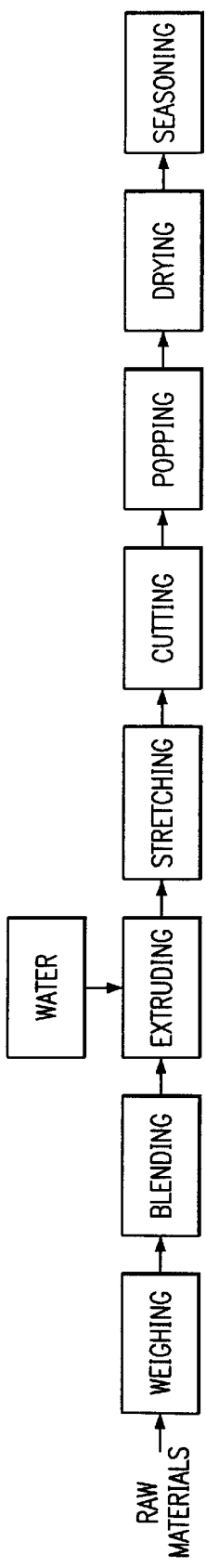
FIG. 1 is a schematic block diagram illustrating an exemplary process in accordance with the present intention.

As shown in FIG. 1, a schematic block diagram illustrating an exemplary process for manufacturing a shaped snack food with annular cavities utilizing a stretched extrudate. After the extrudate is stretched, the cut pieces of extrudate, i.e., pellets, can be immediately expanded without a need for the pellets to be dried or moisture equilibrated as with conventional pellet processes. Further, the shaped half-product with annular cavities has, prior to expansion, a density greater than about 40 lb/ft$^3$ and wall thickness less than about 0.10 inches. These properties are similar to a conventional pellet product while being easier and more economical to produce.

To commence the process, raw materials are weighed and then optionally blended prior to extruding. Particularly, a farinaceous meal, which can be provided by a bulk system, is mixed with other minor ingredients, which can be provided by a component system. The bulk and component systems comprise a method for storing, weighing, and transferring the ingredients. Farinaceous meal can include, for example, yellow corn meal, white corn meal, corn masa flour, rice meal, wheat flour, oat flour, and/or mixtures thereof. Alternatively, a protein source can be used, at least partially, in place of a farinaceous source. For example, a mixture of 75% yellow corn meal and 25% soy protein can be used to produce a final puffed product. Materials in addition to a farinaceous meal and/or protein can include one or more of, for example, sugar, dextrose, dry molasses, emulsifier, wheat bran, shortening, modified food starches, leavening, and others.

Figure 2:
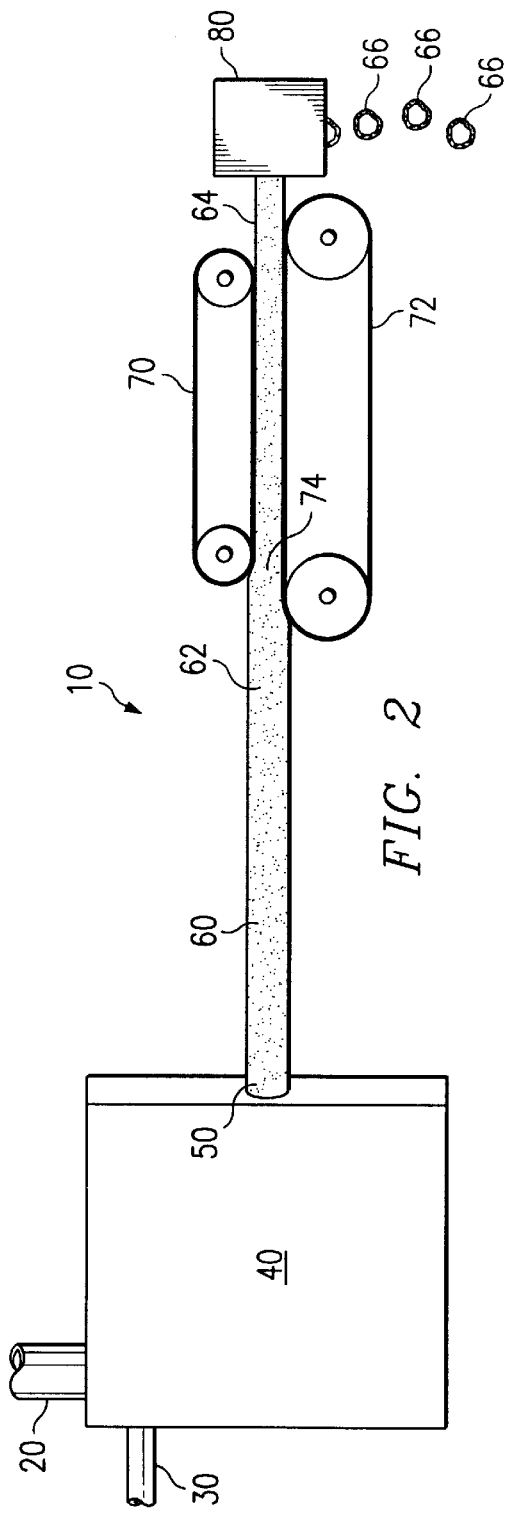
FIG. 2 is a schematic perspective view of a segment of the process shown in FIG. 1 including through the cutting step whereby pellets are formed.

As shown in process 10 in FIG. 2 the raw material(s) are fed to an extruder 40 via a dry ingredient feed line 20 after first being weighed. Along with dry ingredients, water is fed via a water and/or steam line 30. Therein, the dry ingredients along with water produce a tubular extrude 60. To aid the process, a preconditioner (not shown), or other apparatus, may also be used to prehydrate and/or precook the mixture prior to the mixture being fed to an extruder. The amount of water that is added to the dry ingredients is determined by the desired moisture content of extrudate 60 to be produced.

With this process, the moisture content of extrudate 60 just prior to leaving extruder 40 via die orifice 50 is about 15% to about 35%, more preferable about 25%. For example, extruder 50 is a twin screw extruder such as an APV Baker BP50 or a Cextral BC45. A single screw extruder may also be used, or any means of mixing, heating, and forming the mixture into a dough and extruding it through a die orifice. The extruder outlet temperature, which is determined by measuring the extrudate temperature prior to exiting extruder 40, is about 245° F. to about 320° F., more preferable about 285° F. The extruder outlet pressure is about 50 psi to about 800 psi, more preferable about 150 psi to about 500 psi. The amount of mechanical work applied to the raw material(s) by the extruder is about 5 W·hr/kg. to about 150 W·hr/kg. At these conditions, the extrudate produced will have sufficient rheological properties for stretching. In cooking, the starch granules in the raw material will be sufficiently opened for further processing From extruder 40, the extrudate passes through a modified die insert to form an extrudate with an annular cavity 60. The die opening gap is set depending on the desired thickness of the product being produced. For example, the die opening gap can be between about 0.015 inches to about 0.60 inches, more preferably about 0.035 inches. Essentially, extrudate passes around die insert 50 having at least one ring-like opening for the extrudate to flow through. From a middle portion of the at least one ring-like opening, a source of air, other gas, or liquid is provided to allow extrudate with an annular cavity 60 to be produced from die insert 50. The extrudate 60 upon departure from the extruder to atmospheric conditions immediately expands (prepuffs) because of the sudden drop in pressure and flash boiling of the water in the extrudate. As a result of the flash, the moisture content of extrudate 60 decreases to about 9% to about 20%.

The pre-puffed extrudate tube 62 enters gap 74 formed between upper roller 70 and lower roller 72, which for example are caterpillar rollers, for stretching. As depicted in FIG. 2, the length of gap 74 is slightly smaller than the diameter of the stretched extrudate tube 62. This slight difference between the diameter of the pre-puffed extrudate tube 62 and gap 74 allows for the application of force between rollers 70 and 72 to allow sufficient friction to occur between the surfaces of rollers 70 and 72 and the outer surface of extrudate tube 60. The tension in the ribbon, provided by the stretching rollers, counteracts the expansion caused by the prepuffing at the die due to steam formation. This results in the ribbon, after initially expanding, returning to an unexpanded, thin pellet like nature with a density greater than about 40 lb/ft3 and a thickness of less than about 0.1 inches. By control of the volume of the air, gas, or liquid injected in the center of the annular cavity, sufficient pressure can be obtained in the center of the extrudate tube to keep it from collapsing when pressed between the rollers.

Further, the rollers are positioned at a distance away from the extruder to allow the extrudate to cool sufficiently so that the extrudate tube becomes sufficiently rigid prior to passing between the rollers so the extrudate tube is not broken or substantially crushed. This distance, for example, can be from about 2 feet to about 20 feet, most preferably about 10 feet. Within this distance, the extrudate cools to a temperature of about 120° F. to about 200° F., most preferable about 160° F. At these conditions, the rollers 70 and 72 are operated to increase the speed of the extrudate tube by at least about 1.5 times, preferably at least about three times, the linear velocity of the extrudate tube leaving the extruder.

After the extrudate tube 60 is stretched, the stretched extrudate 64 is fed into a cutter 80 for forming cut pieces of pellets 66. Depending on the speed of the cutter, thin shapes such as rings, or longer shapes, such as tubes, can be made. Pellets at this stage are not expanded finished product, but are instead a "half-product." This is because with further treatment the pellets expand into puffed products ("puffs"). Pellets 66, for example, have a wall thickness of about 0.015 inches to about 0.07 inches, more preferably about 0.04 inches. Also, the wall density of pellets 66 is about 40 lb/ft$^3$ to about 100 lb/ft$^3$, more preferably about 80 lb/ft$^3$. Thereafter, pellets 66 are sent for puffing in, for example, a hot air popper or fryer.

For puffing, pellets 66 are transferred to a hot air puffer (not shown) or other heating source without the need for a moisture equilibration or dehydration step prior to puffing. Alternative sources for puffing include frying, microwave, or other heat sources. For example, the hot air puffer is operated at about 500° F. but can be operated as low as about 400° F. Higher puffing temperatures can be used but should be lower than the temperature at which the puffs become scorched. Exposure in the hot air puffer occurs for about 60 seconds, but can be increased or decreased depending on the formulation used or the amount of puffing desired. The moisture content of the product exiting the hot air puffer will be between about 1% and about 10%, more preferably around about 3% to about 4%.

After puffing, the puffs are finished dried (not shown) at about 150° F. to about 450° F., more preferably about 300° F. Sufficient finish drying occurs in about five minutes and can be a one or multiple stage drying. The puffed product wall thickness, for example, can range from 0.060 inches to about 0.170 inches, more preferably about 0.12 inched. The puffed product wall density is about 15 lb/ft$^3$ to about 25 lb/ft$^3$, more preferably about 21 lb/ft$^3$. The final moisture content after drying can be from about 0.5% to about 3.0%, more preferably about 1.5%. After the finishing drying, the puffed pieces can be seasoned and then packaged.

Referring to the formation of extrudate with an annular cavity, a die insert can be used for injecting gas or liquid into one or more interior portion(s) of extrudate 60. Examples of relevant portions of die inserts made in accordance with the present invention are shown in FIGS. 3a, 3b, 4a, 4b, and 4c.

Figure 3A:
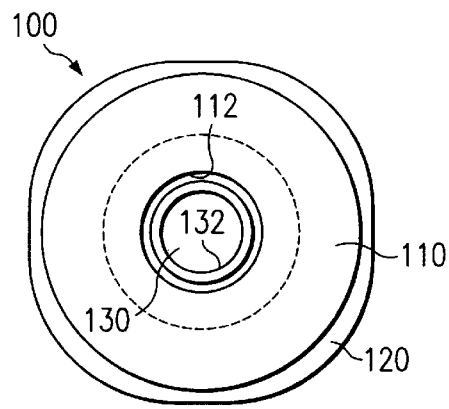
FIG. 3a is a front plan view of a die insert for forming hollow snack product in accordance with the invention.
Figure 4A:
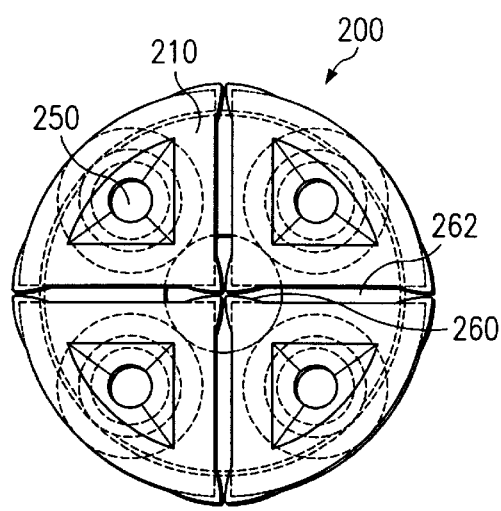
FIG. 4a is a front plan view of a multi-chambered die insert for forming hollow snack product in accordance with the invention.
Figure 3B:
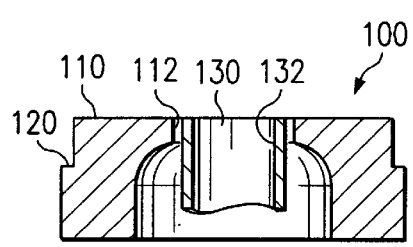
Figure 4B:
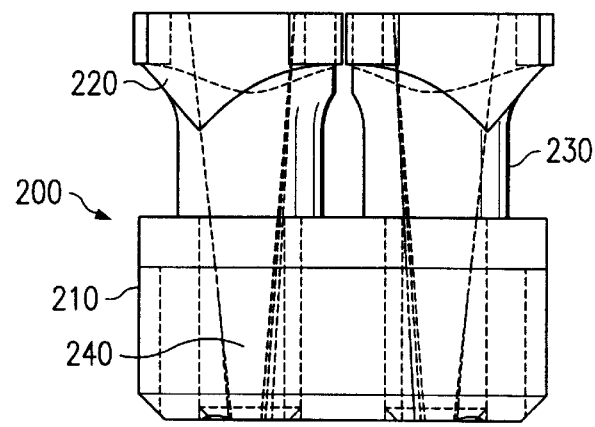
FIG. 4b is a side elevation view of the die insert of FIG. 4a partially disassembled.

As shown in FIGS. 3a and 3b, extrudate with an annular cavity, like extrudate 60 is formed with the use of die insert portion 100. Extrudate is supplied to die insert portion 100 such that a flow of extrudate passes inside ring shaped casing 110. Casing 110 is supported in position by a support notch 120 whereby support notch 120 is disposed against a corresponding receptacle in the die insert (not shown). To form extrudate with an annular cavity 60, air is injected with air channel orifice 130 within center post 132 into the middle of an extrudate flow as extrudate is passed through casing 110 at its inner portion 112. Air is supplied through air channel orifice 130 at such pressure to sufficiently provide a positive pressure inside the extrudate with an annular cavity to allow the extrudate to maintain its shape without being substantially deformed by subsequent handling by the stretching rollers.

Figures 4C, 5A, 5B, 6A, 6B:
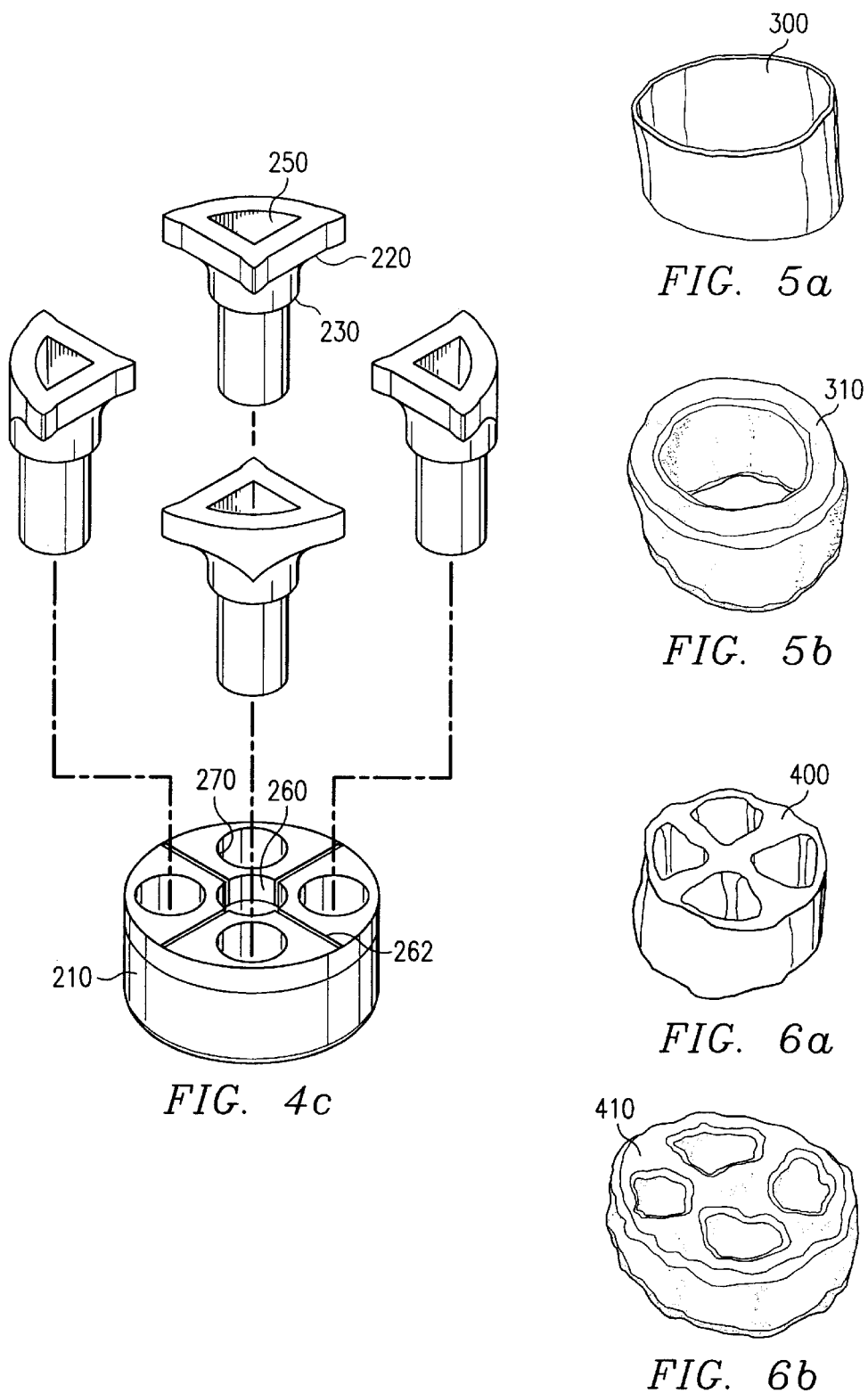

The extrudate with an annular cavity produced with the use of die insert portion 100 produces pellet product as shown in FIG. 5a. Pellet 300 is a thin wall intermediate product as described above. Upon further treatment in a hot air puffer, a puffed product 310 can be formed as shown in FIG. 5b. The puffed product or puff 310 has a reduced bulk wall density and increased wall thickness as compared to pellet 300.

To form a multi-chambered extrudate with annular cavities, a die insert portion 200 can be used. Die insert portion 200 is comprised of a die insert casing 210 through and around which extrudate is passed. Air channel tubes 230 are supported in casing 210 enclosed within a center post in each chamber (not shown) but is comparable to center post 132. Within each tube 230, is an open passage air channel 240 with each having an orifice 250. Air, other inert gas, or liquid is passed through the die insert and exits via orifices 250 while extrudate is passed through extrudate channel 260 and extrudate spoke channels 262 to form a wagon wheel shaped pellet 400 as shown in FIG. 6a. As is shown in the exemplary pellet 400, the four air channels 240 produce the four open sections within the wagon wheel shaped pellet 400. Once pellet 400 is puffed, the puffed product or puff 410 is produced as shown in FIG. 6b. Puff 410 has a reduced bulk wall density and increased wall thickness as compared to pellet 400.

In addition to the shapes shown in FIGS. 5a, 5b, 6a, and 6b, other shapes are possible by modifying the blade, air pressure within the extrudate tube, moisture content of the extrudate, or combinations thereof. For example, by closing one end of the pellet, a pocket-shaped pellet and puff can be produced. By closing both ends of the pellet, a pillow-shaped pellet and puff can be produced.

Products manufactured in accordance with the above-described features are produced as shaped, puffed products with annular cavities. Further, these puffed products are capable of assuming the desirable light and crunchy texture of a shaped, puffed product without the need of a conditioning step for moisture dehydration or equilibration prior to puffing as is needed with conventional pellet processes. Thereby, the invention allows for the production of a shaped, puffed product with an annular cavity with a shorter and less expensive process as compared to conventional processes. Another interesting feature to these products are that they are capable of being made with one or more annular cavities within each puffed product depending on the die insert used in extrusion.

While the invention has been particularly shown and described with reference to a preferred embodiment, it will be understood by those skilled in the art that various changes in form and detail may be made therein without departing from the spirit and scope of the invention.

What is claimed is:

1. A method for producing expanded, shaped pellet products with at least one annular cavity, comprising:

providing an extrudate to a die disposed at an end of an extruder;

passing the extrudate through the die wherein a die insert produces a tubular shaped extrudate under such conditions that the extrudate initially expands when exiting the die;

stretching the expanded tubular shaped extrudate; and forming shaped pellet products with an annular cavity from the stretched tubular shaped extrudate.

2. The method of claim 1 wherein the stretching of the expanded extrudate returns the extrudate to an unexpanded state.

3. The method of claim 1 wherein the providing of the extrudate further comprises supplying a dry ingredient mixture and water to the extruder.

4. The method of claim 3 wherein the dry ingredient mixture comprises a farinaceous mixture, including at least one of the following: yellow. corn meal, white corn meal, corn masa flour, rice meal, wheat flour, and oat flour.

5. The method of claim 4 wherein the dry ingredient mixture further includes at least one of the following: sugar, dextrose, dry molasses, emulsifier, shortening, modified food starches, leavening, and wheat bran.

6. The method of claim 4 wherein the dry ingredient mixture further includes protein.

7. The method of claim 1 wherein the die insert has at least one portion whereby the extrudate flows around to form the extrudate with an annular cavity.

8. The method of claim 7 wherein the die insert provides at least one stream of gas or liquid into at least one interior portion of the extrudate with an annular cavity.

9. The method of claim 7 wherein the die insert produces extrudate having multiple annular cavities.

10. The method of claim 1 wherein the stretching of the shaped extrudate increases the linear velocity of the shaped extrudate by at least 1.5 times.

11. The method of claim 10 wherein the stretching of the shaped extrudate with annular cavity increases the linear velocity of the extrudate by at least three times.

12. The method of claim 1 wherein the step of forming shaped pellet products further comprises cutting the stretched extrudate with an annular cavity into tube, pocket, or pillow shaped pellets.

13. The method of claim 12 wherein the step of forming shaped pellet products further comprises puffing the shaped pellets after cutting.

14. The method of claim 13 wherein the puffing is produced by heating the pellets.

15. The method of claim 14 wherein the heating includes hot air, frying, or microwaving.

16. The method of claim 13 wherein the pellets are not substantially dehydrated or conditioned prior to being puffed.

17. The method of claim 1 wherein each one of the shaped pellet products is a puffed snack product having multiple annular cavities sections.

18. The method of claim 1 wherein the moisture content of the extrudate in the extruder is from about 20% to about 25%.

19. The method of claim 1 wherein a mixture which forms the extrudate is preconditioned prior to extrusion.

20. The method of claim 1 wherein an amount of mechanical work ranging between about 5 W·hr/kg to about 150 W·hr/kg is applied during extrusion.

21. The method of claim 1 wherein the step of passing the extrudate through the die is performed at a pressure of less than about 750 psi.

22. The method of claim 1 wherein the step of passing the extrudate through the die is performed at a pressure of less than about 500 psi.

23. The method of claim 1 wherein the step of passing the extrudate through the die is performed at a temperature between about 275° F. and about 300° F.

24. The method of claim 1 wherein the extrudate is passed through a die orifice gap height of between about 0.025 inches and 0.045 inches.

25. The method of claim 1 wherein the pellet products have a density of greater than about 60 lb/ft$^3$.

26. The method of claim 1 wherein the pellet products have a thickness of less than about 0.070 inches.

27. The method of claim 1 wherein the pellet products have a thickness of less than about 0.050 inches.

* * * * *